US008990766B2

(12) United States Patent
Schneider (10) Patent No.: US 8,990,766 B2
(45) Date of Patent: Mar. 24, 2015

(54) CONSTRUCTION OF OBJECT-ORIENTED PROGRAMMING (OOP) PATTERNS BY BEHAVIOR DELEGATION

(75) Inventor: Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 1765 days.

(21) Appl. No.: 11/178,871

(22) Filed: Jul. 10, 2005

(65) Prior Publication Data

US 2007/0011652 A1    Jan. 11, 2007

(51) Int. Cl.
*G06F 9/44* (2006.01)

(52) U.S. Cl.
CPC ... *G06F 8/36* (2013.01); *G06F 8/35* (2013.01)
USPC .......................... 717/105; 717/108; 717/109

(58) Field of Classification Search
None
See application file for complete search history.

(56) References Cited

U.S. PATENT DOCUMENTS

| | | | | |
|---|---|---|---|---|
| 5,819,281 | A * | 10/1998 | Cummins | 707/103 R |
| 6,256,780 | B1 * | 7/2001 | Williams et al. | 717/107 |
| 6,324,541 | B1 | 11/2001 | de l'Etraz et al. | |
| 6,519,571 | B1 | 2/2003 | Guheen et al. | |
| 6,851,105 | B1 * | 2/2005 | Coad et al. | 717/106 |
| 7,024,633 | B1 * | 4/2006 | Mann et al. | 715/765 |
| 2003/0204503 | A1 | 10/2003 | Hammer et al. | |
| 2004/0044990 | A1 * | 3/2004 | Schloegel et al. | 717/113 |
| 2005/0071808 | A1 * | 3/2005 | Luculli | 717/106 |
| 2005/0257190 | A1 * | 11/2005 | Shaburov et al. | 717/106 |
| 2007/0038979 | A1 * | 2/2007 | Oral et al. | 717/108 |
| 2008/0163161 | A1 * | 7/2008 | Shaburov et al. | 717/105 |
| 2008/0301625 | A1 * | 12/2008 | Cook et al. | 717/104 |

OTHER PUBLICATIONS

Dirk Riehle, A Role-Based Design Pattern Catalog of Atomic and Composite Patterns Structured by Pattern Purpose, 1997, Ubilab Technical Report 97.1.1. Zürich, Switzerland: Union Bank of Switzerland.*
Dirk Riehle,Composite design patterns, 1997, In Proceedings of the 1997 Conference on Object-Oriented Programming Systems, Languages, and Applications (OOPSLA '97). ACM Press, 1997. p. 218-228.*
Günter Kniesel, Type-Safe Delegation for Run-Time Component Adaptation, 1999, Lecture Notes in Computer Science; vol. 1628, Proceedings of the 13th European Conference on Object-Oriented Programming, pp. 351-366.*

(Continued)

*Primary Examiner* — Jason Mitchell
(74) *Attorney, Agent, or Firm* — Damion Josephs (57) ABSTRACT

Object-oriented programming (OOP) design patterns are constructed at least partially by delegating their behaviors to preconstructed OOP patterns to implement the behaviors. A new OOP pattern having one or more behaviors is defined. Each of at least one of the behaviors is delegated to a preconstructed OOP pattern, the preconstructed OOP pattern therefore implementing the behavior. The new OOP pattern is thus constructed at least partially by delegating at least one of its behaviors to the preconstructed OOP patterns. Delegating a behavior to one of the preconstructed OOP patterns can be accomplished within a graphical user interface (GUI). Graphical representations of the new OOP pattern and of the preconstructed OOP patterns are displayed. Dragging the graphical representation of a selected preconstructed OOP pattern onto the graphical representation of the new OOP pattern causes a behavior of the new OOP pattern to be delegated to the selected preconstructed OOP pattern.

15 Claims, 6 Drawing Sheets

(56) References Cited

OTHER PUBLICATIONS

Gert Florijn, Marco Meijers, Pieter van Winsen, Tool support for object-oriented patterns, 1997, Springer Berlin/Heidelberg, ECOOP'97—Object-Oriented Programming, vol. 1241/1997, pp. 472-495.*

Delegation (programming) wikipedia entry, http://en.wikipedia.org/wiki/Delegation_%28programming%29, first accessed no later than and thus dated no later than Mar. 7, 2011.

Lecture notes for CS422, University of Illinois, https://courses.engr.illinois.edu/cs4221sp2009/lectures/CS422-lecture25-2x3.pdf, dated Spring 2009.

* cited by examiner

CONSTRUCTION OF OBJECT-ORIENTED PROGRAMMING (OOP) PATTERNS BY BEHAVIOR DELEGATION

FIELD OF THE INVENTION

The present invention relates generally to constructing object-oriented programming (OOP) design patterns, and more particularly to such construction by delegating the behaviors of new OOP design patterns to preconstructed OOP design patterns to implement the behaviors.

BACKGROUND OF THE INVENTION

Object-oriented programming (OOP) is a type of programming that supports object technologies. OOP is an evolutionary form of modular programming with more formal rules that allow pieces of software to be reused and interchanged between programs. Major concepts of OOP include encapsulation, inheritance and polymorphism.

Encapsulation is the creation of self-sufficient modules that contain the data and the processing, including the data structures and functions that manipulate that data. These user-defined, or abstract, data types are called "classes." One instance of a class is called an "object." For example, in a payroll system, a class could be defined as Manager, and Pat and Jan, the actual objects, are instances of that class.

Classes are typically created in hierarchies, and inheritance allows the knowledge in one class to be passed down the hierarchy. This means less programming is required when adding functions to complex systems. If a step is added at the bottom of a hierarchy, then only the processing and data associated with that unique step needs to be added. Everything else about that step is inherited.

Object-oriented programming allows procedures about objects to be created whose exact type is not known until runtime. For example, a screen cursor may change its shape from an arrow to a line depending on the program mode. The routine to move the cursor on screen in response to mouse movement would be written for "cursor," and polymorphism allows that cursor to be whatever shape is required at runtime. Polymorphism also allows a new shape to be easily integrated into the program.

An OOP design pattern, or more simply an OOP pattern or a pattern, is a common solution to a common problem within a given context. Patterns in the context of software development are used extensively to solve small and large problems in the design, modeling, implementation, deployment, and maintenance of software systems. The application of a pattern to or within a software system results in the system being structured and behaving in certain ways dictated by or consistent with the pattern. As such, a pattern can be considered as defining a set of constraints on the objects that make up the pattern.

The application of a pattern generally occurs by acting upon OOP objects through one or more explicit or implicit models that describe the objects and allow their manipulation. Patterns can be created in a variety of different OOP languages, such as Java, C++, and other OOP languages. Certain patterns and classes of patterns are recognized across the software industry, and may have implementations provided by software development tools.

Patterns can be created in the Java programming language, for example, using a software development tool. There are two different representations of patterns in software code written in the Java programming language in particular. The first representation is the definition of the pattern itself, as provided by the software development tool. The second representation is the definition of a pattern as applied to existing software code, or identified within existing software code that conforms to the definition of the pattern. This representation of a pattern is an instance or application of the definition of a pattern provided by the software development tool.

An important feature of such software development tools is to allow the creation of new patterns by the end users of the tools. These new patterns may be developed to enforce programming paradigms, standards, or conventions within an organization, as well as to provide general accelerators for the development of applications. For instance, one aspect of the creation of patterns that is desirable is the ability to distribute the patterns across an organization, as well as publicly, and to support and maintain the patterns and the software systems to which the patterns have been implied.

However, the creation and development of patterns can be tedious. Existing software development tools generally only allow the creation of patterns from scratch. As such, developers have to painstakingly define new patterns from their foundations upwards, or copy existing patterns and modify them to result in new or desired functionality. Either way, pattern development is less than optimal, resulting in developers potentially taking less advantage of patterns than they should.

For these and other reasons, there is a need for the present invention.

SUMMARY OF THE INVENTION

The present invention relates to the construction of object-oriented programming (OOP) design patterns by delegating their behaviors to preconstructed OOP design patterns in order to implement the behaviors. A method of the invention defines a new OOP pattern having one or more behaviors. Each of at least one of the behaviors of the new OOP pattern is delegated to one of a number of preconstructed OOP patterns, to implement the behavior by the preconstructed OOP pattern. Thus, the new OOP pattern is constructed at least in part by delegating at least one of the behaviors of the new OOP pattern to the preconstructed OOP patterns.

Delegating each behavior of the new OOP pattern to one of the preconstructed OOP patterns can be accomplished within a graphical user interface (GUI). A graphical representation of the new OOP pattern is displayed, as is a graphical representation of each of the preconstructed OOP patterns. Dragging the graphical representation of a selected preconstructed OOP pattern onto the graphical representation of the new OOP pattern causes a behavior of the new OOP pattern to be delegated to the selected preconstructed OOP pattern.

A system of the present invention includes a GUI mechanism and a delegation mechanism. The GUI mechanism displays graphical representations of a new OOP pattern, and of one or more preconstructed OOP patterns. The GUI mechanism enables the graphical representation of the new OOP pattern to be dragged onto the graphical representations of the preconstructed OOP patterns. The delegation mechanism delegates behaviors of the new OOP pattern to the preconstructed OOP patterns in response to the graphical representation of the new OOP pattern being dragged onto the graphical representations of the preconstructed OOP patterns, in order to implement the behaviors of the new OOP pattern by the preconstructed OOP patterns.

An article of manufacture of the invention includes a computer-readable medium, and means in the medium. The medium may be a recordable data storage medium, or another type of computer-readable medium, such as a modulated carrier signal. The means is for delegating each of at least one behavior of an OOP pattern to one of a number of preconstructed OOP patterns, to implement the behavior by the preconstructed OOP pattern.

Embodiments of the invention provide for advantages over the prior art. A software development tool may be provided that has a library of preconstructed OOP patterns. Thus, new OOP patterns can be easily constructed within a GUI of the development tool by a user dragging graphical representations of the new OOP patterns onto the preconstructed OOP patterns. This causes behaviors, or functions, of the new OOP patterns to be delegated to and thus implemented by the preconstructed OOP patterns. Therefore, developers do not have to construct new OOP patterns from scratch, nor do they have to copy and then modify existing OOP patterns to create new OOP patterns.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview of Design Pattern Behavior Delegation to Other Design Patterns

Figure 1:
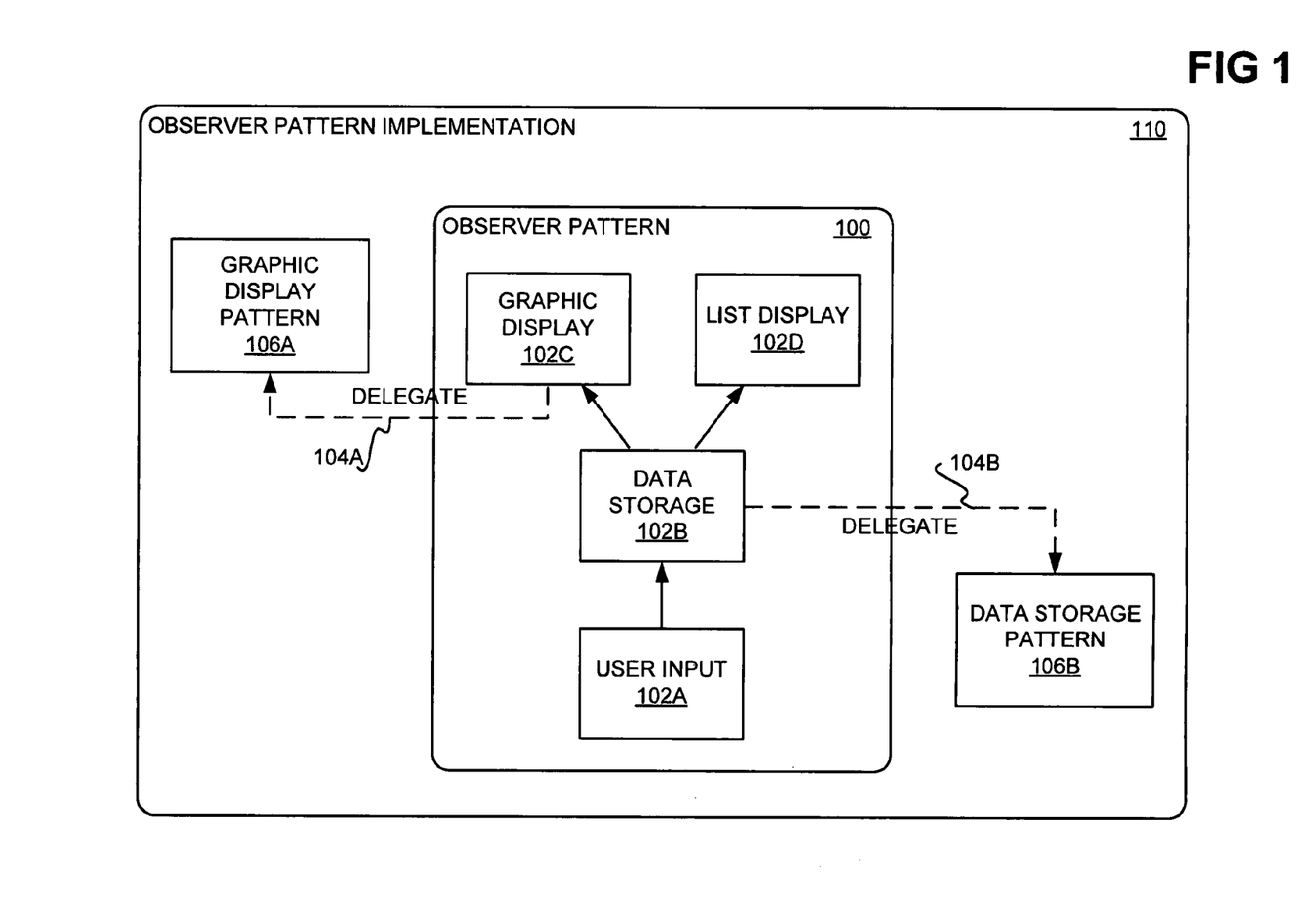
FIG. 1 is a diagram illustrating how an OOP pattern can be constructed by delegating behaviors of the OOP pattern to preconstructed OOP patterns, according to an embodiment of the invention, and is suggested for printing on the first page of the patent.

FIG. 1 illustratively depicts the construction of a new object-oriented programming (OOP) design pattern by delegating behaviors of the OOP design pattern to preconstructed design patterns, according to an embodiment of the invention. A new OOP pattern 100 that is desired to be created is specifically an observer pattern. The OOP pattern 100 is more specifically an OOP design pattern, and is specifically a common solution to a common problem within a given context. The OOP pattern 100 has a predetermined structure and behavior, and functions in accordance with, or dictated by, that structure and behavior. A given OOP pattern is made up of a number of OOP objects, as is described in more detail later in the detailed description.

The new OOP pattern 100 has a number of behaviors 102A, 102B, 102C, and 102D, collectively referred to as the behaviors 102, that each represents a different functional aspect of the OOP pattern 100. As such, each of the behaviors 102 can be considered a sub-function of the OOP pattern 100 that taken together based on the manner by which the behaviors 102 interact with one another and how the behaviors 102 are structured, results in a function of the OOP pattern 100. The observer pattern 100 is a rudimentary design pattern in which user-input data is stored and then displayed. More specifically, the observer pattern 100 divorces the containment, or storage, of data from the display of the data, as is evident from the structure of the observer pattern 100 in FIG. 1.

Thus, the user input behavior 102A receives input from a user, which is passed to the data storage behavior 102B. The data storage behavior 102B stores the data. The graphic display behavior 102C and the list display behavior 102D are different types of display behaviors that display the data stored by the data storage behavior 102B. The display behaviors 102C and 102D are thus observers, in that they observe changes made to the data as stored by the data storage behavior 102B, and display such changes, but do not change the data themselves, and do not store the data themselves. As can be appreciated by those of ordinary skill within the art, it is noted that embodiments of the invention are not limited to any particular type of OOP design pattern, and the description of the observer OOP pattern 100 is provided for example purposes only.

The OOP pattern 100 by itself is not functional, but must be programmed, or implemented, in order so that it can be executed. Typically, an actual implementation of the OOP pattern 100 is developed by coding each of the behaviors 102 as one or more OOP objects. As has been described in the background section, an object is a self-sufficient module that contains data and/or processing on the data, and is specifically an instance of such an abstract data type referred to as a class. Therefore, a developer may simply be able to associate a behavior of the pattern 100 to a preconstructed object to implement the behavior. More often, however, the developer is required to implement each of the behaviors 102 by appropriately organizing and structuring objects. The objects themselves may be preconstructed, or they may be individually hand-coded by the developer.

By comparison, embodiments of the invention realize implementation, or construction, of the OOP pattern 100 at least in part by delegating one or more of the behaviors 102 of the pattern 100 to preexisting, preconstructed OOP patterns that are ready to be executed and can already be fully coded. For example, in FIG. 1, the graphic display behavior 102C has been delegated to a preconstructed graphic display pattern 106A, as indicated by the dotted line 104A, while the data storage behavior 102B has been delegated to a preconstructed data storage pattern 106B, as indicated by the dotted line 104B. The developer thus can realize a full implementation 110 of the OOP pattern 100 at least in part by utilizing existing, fully developed, and preconstructed OOP patterns 106A and 106B, collectively referred to as the preconstructed OOP patterns 106.

Delegating the behaviors 102 of the OOP pattern 100 to the preconstructed OOP patterns 106 can be defined as the assignment of the preconstructed OOP patterns 106 to implement the behaviors 102 of the OOP pattern 100. In particular, each of the behaviors 102 of the OOP pattern 100 may have an expand method and/or an update method. The expand method of a behavior of a pattern is the processing that is performed to execute, effect, or "expand" the behavior of the pattern. The update method of a behavior of a pattern is a listener method that "listens" for executions, effectuations, or "expansions" of the behavior of the pattern via the expand method, and performs other or additional processing as a result. In such embodiments, a behavior of a new OOP pattern may be delegated to a preconstructed OOP pattern by attaching, associating, or assigning the preconstructed OOP pattern to the expand method of the behavior, the update method of the behavior, or another method of the behavior.

It is noted that the developer still is able to construct his or her own OOP patterns to implement the behaviors 102, or appropriately assemble and structure preexisting or newly constructed OOP objects to implement the behaviors 102. However, in many situations the developer may avail him or herself to preconstructed OOP patterns in order to create implementations of new OOP patterns. For instance, in the example of FIG. 1, the developer may have decided that the user input behavior 102A and the list display behavior 102D require custom solutions that necessitate the development of custom patterns and/or objects. However, the developer may have determined that the data storage behavior 102B and the graphic display behavior 102C could be implemented by delegating these behaviors to fully implemented preconstructed OOP patterns 106. Thus, constructing the implementation 110 of the observer pattern 100 is made easier for this developer, because he or she only has to hand-code two of the behaviors 102, and not all four of the behaviors 102.

Furthermore, the implementation 110 of the observer pattern 100 upon construction itself becomes a preconstructed OOP pattern. That is, the implementation 110 of the observer pattern 100 can itself be delegated behaviors of additional new OOP patterns, to implement these additional new OOP patterns. Constructing a new OOP pattern by using preconstructed OOP patterns also results in the building of a library of preconstructed OOP patterns to rely upon in the future. The more OOP patterns that are created, the more preconstructed OOP patterns are in existence to use for future OOP pattern implementation needs.

As such, the implementation 110 of the OOP pattern 100 is of equal hierarchical priority with respect to the preconstructed OOP patterns 106. The preconstructed OOP patterns 106 are not subsidiary in any way to the implementation 110 of the OOP pattern 100, except that the preconstructed OOP patterns 106 are delegated two of behaviors 102 of the OOP pattern 100 to realize the implementation 110. Otherwise, the implementation 110 of the OOP pattern 100 can be utilized no differently than the preconstructed OOP patterns 106: receiving delegations of behaviors of other new OOP patterns to implement those OOP pattern behaviors. Similarly, the preconstructed OOP patterns 106 are no different than the implementation 110 of the OOP pattern 100, in that they can stand by themselves, in that they can be executed individually or independently, and are not required to be a part of another OOP pattern to implement the behavior of that other OOP pattern via delegation.

Technical Background of Design Patterns, Objects, and Software Code

Figure 2:
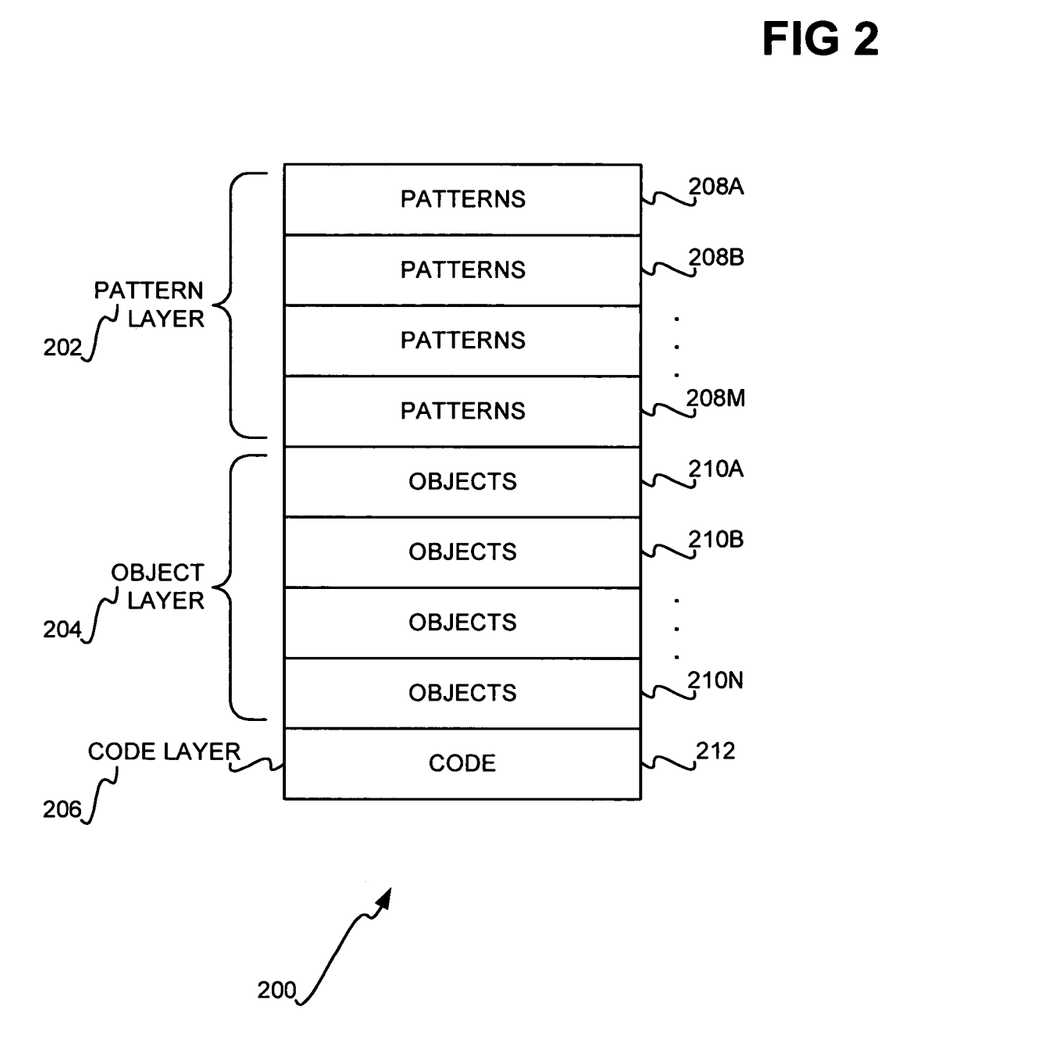
FIG. 2 is a diagram illustrating the relationship between patterns, objects, and software code, according to an embodiment of the invention.

FIG. 2 illustrates the relationship 200 between object-oriented programming (OOP) design patterns, OOP objects, and software code, according to an embodiment of the invention. The relationship 200 from top-down includes a pattern layer 202, an object layer 204 underneath the pattern layer 202, and a code layer 206 underneath the object layer 204, where the pattern layer 202 is hierarchically greater than the object layer 204, and the object layer 204 is hierarchically greater than the code layer 206. In a general sense, the OOP patterns of the pattern layer 202 are ultimately made up of the OOP objects of the object layer 204, and the OOP objects of the object layer 204 are ultimately made up of the software code of the code layer 206. A pattern may thus be considered in one embodiment as defining a set of constraints on the objects that make up the pattern, where the pattern in this instance is indeed directly made up of one or more objects, as opposed to being directly made up of only other patterns, which themselves may directly be made up of patterns and/or objects, and so on.

As has been described in the previous section of the detailed description, OOP patterns can be employed via delegation to construct other OOP patterns. Thus, the pattern layer 202 itself can be considered to be made up of hierarchically layered OOP patterns 208A, 208B, . . . , 208M, collectively referred to as the OOP patterns 208. A given OOP pattern 208A may be implemented by delegating one or more of its behaviors to one or more of the OOP patterns 208B, for instance. However, at some stage, the lowest OOP patterns 208M within the hierarchy have to be made up of OOP objects within the object layer 204.

Similarly, the object layer 204 itself can be considered to be made up of hierarchically layered OOP objects 210A, 210B, . . . , 210N, collectively referred to as the OOP objects 210, where the number of the objects 210, referred to by the letter N, may be greater than, equal to, or less than the number of the OOP patterns 208, referred to be the letter M. A given OOP object 208A may thus be implemented by delegating its functionality to one or more of the OOP objects 208B, for instance, where such delegation is a different type of delegation than the pattern delegation of embodiments of the invention. At some stage, the lowest OOP patterns 208N within the hierarchy have to be made up of software code within the software code layer 206.

The software code 212 within the software code layer 206 may be OOP code of any of a number of different OOP languages, such as Java, C++, and so on. However, the construction of a system is typically and desirable performed from top-down. Thus, first the patterns 208 of the pattern layer 202 are developed, then the objects 210 of the object layer 204 are developed, and finally the software code 212 of the code layer 206 is developed. Such a top-down approach lends itself to modularization, and easier-to-understand software development. Rather than focusing on software code first, for instance, the approach highlighted by the relationship 200 in FIG. 2 focuses on patterns first. The patterns may be used to encode a given business or program logic, which is then further fleshed out by using objects, which are ultimately coded with software code.

Therefore, the patterns 208 of the pattern layer 202 can be considered as ultimately including one or more of the OOP objects 210 of the object layer 204. Such objects are organized in a specific structure dictated by a pattern. Furthermore, the interaction among the objects of a pattern are governed by a set of constrains dictated by the pattern. As such, the patterns represent a further abstraction of a collection of objects. Developers can speak in shorthand with one another, where standardized patterns have become known by particular names, such as the observer pattern 100 that has been described in relation to FIG. 1.

Specific Embodiments, Including Graphical User Interface and System

Figure 3:
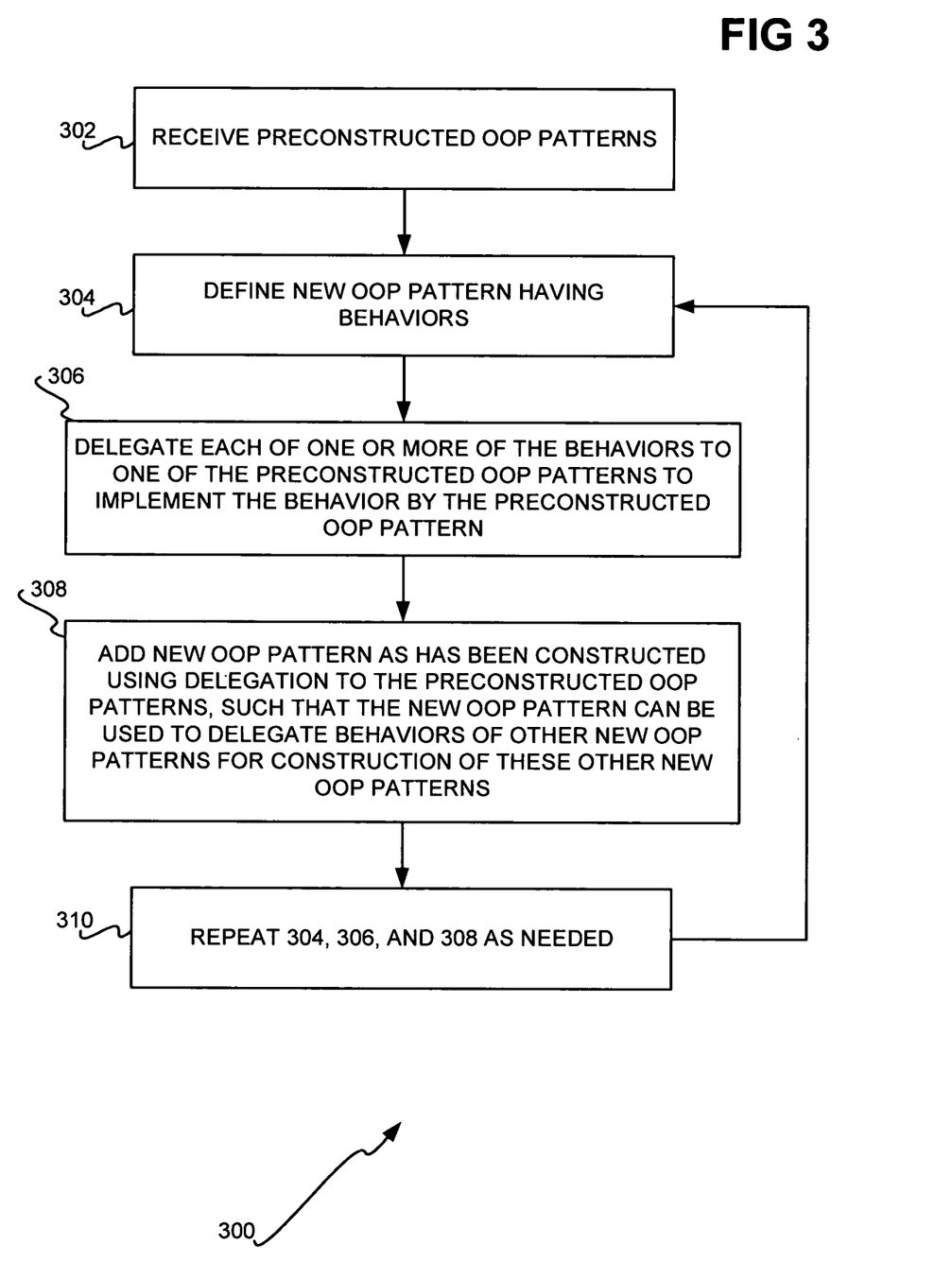
FIG. 3 is a flowchart of a method for constructing OOP patterns from preconstructed OOP patterns using behavior delegation, according to an embodiment of the invention.

FIG. 3 shows a method 300 for constructing object-oriented programming (OOP) design patterns by delegating their behaviors to preconstructed OOP design patterns, according to an embodiment of the invention. At least some parts of the method 300 may be implemented as a computer program stored on a computer-readable medium, such as a recordable data storage medium, or a modulated carrier signal. First, the preconstructed OOP patterns are received (302). For example, in the context of a software development tool, these OOP patterns may be installed or downloaded into the tool, so that they are available to the developer.

Next, a new OOP pattern is defined, including its behaviors (304). Definition of an OOP pattern includes defining one or more behaviors for the OOP pattern, and then defining how those behaviors are structurally or functionally interconnected (i.e., interact) with one another. For example, in the example OOP pattern 100 of FIG. 1, defining the OOP pattern 100 first includes defining each of the behaviors 102 of the pattern 100. Defining the behaviors of a pattern may include specify the input, output, and functionality of those behaviors. Defining the functionality of a behavior may include defining or specifying the methods of the behaviors, such as the expand and update behaviors, and/or defining the processing to be performed by each behavior. Furthermore, in the example OOP pattern 100, defining the structural or functional interconnects among the behaviors 102 includes defining the process flow among the behaviors 102. As depicted in FIG. 1, for instance, the arrows among the behaviors 102 represent the structural or functional interconnection among the behaviors 102, and thus the process flow of the OOP pattern 110 itself.

One or more of the behaviors of the new OOP pattern are then each delegated to one of the preconstructed OOP patterns, to implement that behavior by the selected preconstructed OOP pattern (306). Not all of the behaviors of the new OOP pattern need be delegated to a preconstructed OOP pattern. Furthermore, more than one behavior may be delegated to the same preconstructed OOP pattern. In such instance, it is said that each such behavior is delegated to a different instance of the same preconstructed OOP pattern. Not depicted in the method 300 of FIG. 3 is that those behaviors of the new OOP pattern that are not delegated to preconstructed OOP patterns may be manually implemented, in the sense that a programmer may code these behaviors using a programming language. However, delegating at least one of the behaviors of the new OOP pattern means that the new OOP pattern is constructed or implemented at least in part by performing such delegation.

The new OOP pattern that has been constructed, or implemented, using delegation is then added as a member to or of the preconstructed OOP patterns (308). This means that the new OOP pattern, as has been fully implemented or realized, can be used to receive delegation of the behaviors of other new OOP patterns that may be defined. As such, 304, 306, and 308 may be repeated as needed for other new OOP patterns that have to be defined and constructed via delegation (310). For example, a second new OOP pattern may be defined, and then a behavior of this second new OOP pattern may be delegated to the first new OOP pattern previously defined and constructed. Similarly, a third new OOP pattern may be defined, and behaviors of this third new OOP pattern may be delegated to the first and the second new OOP patterns previously defined and constructed.

Figure 4:
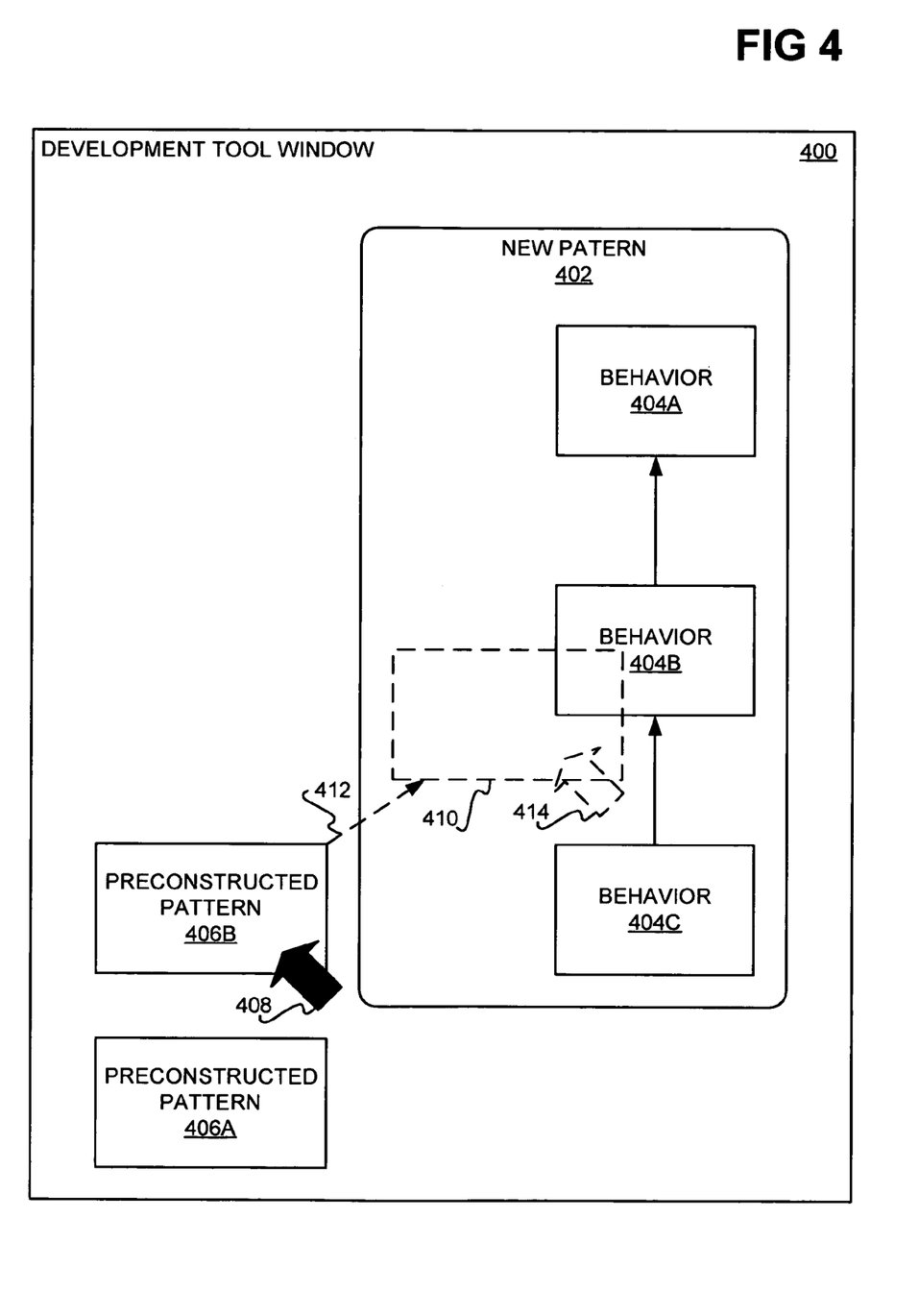
FIG. 4 is a diagram illustrating a graphical user interface (GUI) for construction OOP patterns from preconstructed OOP patterns using behavior delegation, according to an embodiment of the invention.

FIG. 4 shows a graphical user interface (GUI) 400 of a software development tool in relation to which the behaviors of new OOP design patterns can be delegated to preconstructed OOP design patterns, according to an embodiment of the invention. The GUI 400 is represented in FIG. 4 as a software development tool window as may be displayed on the display of a developer's computer. A graphical representation 402 of a new OOP pattern includes graphical representations 404A, 404B, and 404C, collectively referred to as the graphical representations 404, depicting how a developer has defined the new OOP pattern and how he or she has defined the behaviors of the new OOP pattern, including their structural, functional, and/or interactive interconnection. The GUI 400 further includes graphical representations 406A and 406B, collectively referred to as the graphical representations 406, of preconstructed OOP patterns that are available to the developer for delegating behaviors of the new OOP pattern.

Delegation of behaviors of the new OOP pattern to one of these preconstructed OOP patterns is performed as is now described in relation to the developer delegating the behavior having the graphical representation 404B to the preconstructed OOP pattern having the graphical representation 406B. The developer first moves a GUI mouse pointer 408 over the graphical representation 406 of the desired preconstructed OOP pattern, by using a pointing device, such as a mouse or a touchpad that correspondingly causes movement of the mouse pointer 408. The developer then drags the graphical representation 406B of the preconstructed OOP pattern over the graphical representation 404B of the desired behavior that is to be delegated to this pattern. Within the GUI 400, such dragging results in or causes the behavior having the graphical representation 404B being delegated to the preconstructed OOP pattern having the graphical representation 406B.

Dragging means that when the GUI mouse pointer 408 has been moved over the graphical representation 406B of the desired preconstructed OOP pattern, a predetermined pointing device button, typically the left button, is pressed and held down. Thereafter, the developer effects movement in relation to the pointing device, to correspondingly cause the mouse pointer 408 and the graphical representation 406B so that the graphical representation 406B overlaps, or is moved over, the graphical representation 404B of the desired behavior, as indicated by the arrow 412. At such an example position 410 of the graphical representation 406B (and at such an example position 414 of the mouse pointer 408), the developer releases the predetermined pointing device button, so that is it no longer held down.

Figure 5:
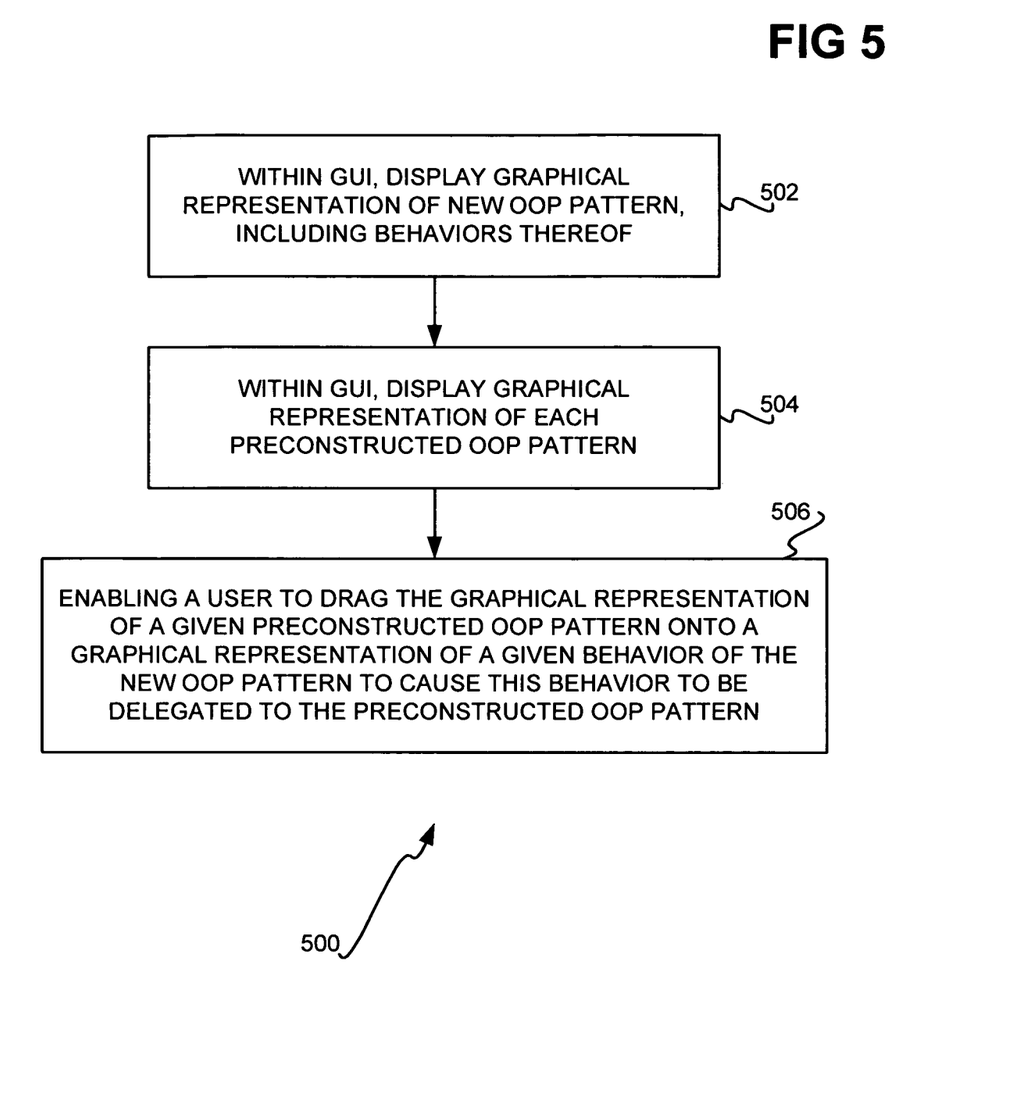
FIG. 5 is a flowchart of a method for using the GUI of FIG. 4 to construct OOP patterns from preconstructed OOP patterns using behavior delegation, and which can be employed as at least a part of the method of FIG. 3, according to an embodiment of the invention.

FIG. 5 shows a method 500 that may be used to delegate a behavior of a new OOP design pattern to a preconstructed OOP design pattern within a GUI environment or software development tool, according to an embodiment of the invention. For instance, the method 500 may be performed each time 306 of the method 300 of FIG. 3 is performed, where the user is constructed a new OOP pattern within a GUI environment or software development tool, such as the GUI 400 of FIG. 4. However, other approaches to delegate behaviors of OOP patterns to preconstructed OOP design patterns may also be employed, in lieu of the method 500.

A graphical representation of a new OOP pattern, including graphical representations of its behaviors, is displayed within the GUI (502). Similarly, graphical representations of the available preconstructed OOP patterns are displayed within the GUI (504). It is noted that the graphical representations of the preconstructed OOP patterns in one embodiment do not include graphical representations of their behaviors, in contradistinction to the graphical representation of the new OOP pattern, which includes graphical representations of its behaviors. This is because the preconstructed OOP patterns are considered as abstractions, or "black boxes," which can be selected by the developer as desired to implement behaviors of the new OOP pattern via delegation, such that the developer typically has no need to view how the preconstructed OOP patterns themselves are defined. Finally, the developer or other use is enabled to drag the graphical representation of a given preconstructed OOP pattern onto or over the graphical representation of a given behavior of the new OOP pattern, to cause this behavior to be delegated to the preconstructed OOP pattern (506), as has been described in relation to and shown in FIG. 4.

Figure 6:
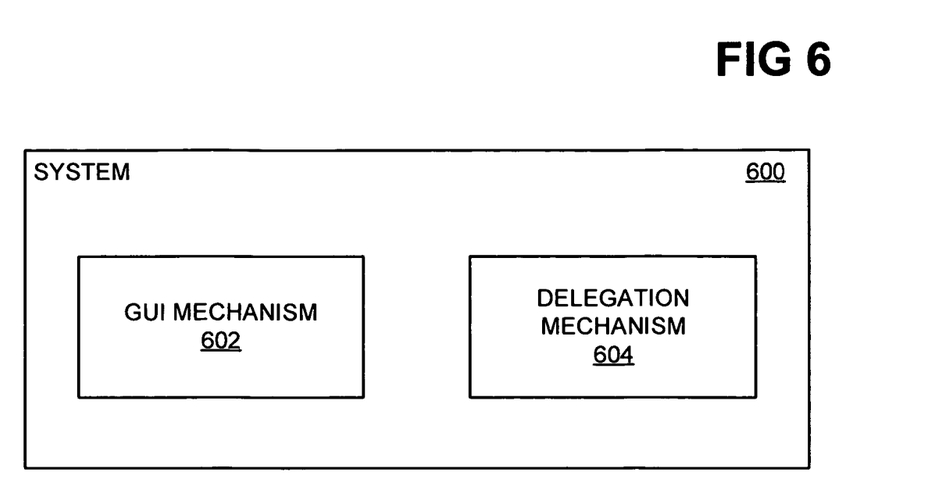
FIG. 6 is a diagram of a rudimentary GUI system for constructing OOP patterns from preconstructed OOP patterns using behavior delegation, according to an embodiment of the invention.

Finally, FIG. 6 shows a rudimentary system 600 for constructing new OOP design patterns by delegating one or more behaviors of such a new OOP design pattern to preconstructed OOP design patterns to implement these behaviors, according to an embodiment of the invention. The system 600 is depicted in FIG. 6 as including a GUI mechanism 602 and a delegation mechanism 604. Each of the mechanisms 602 and 604 may be implemented in software, hardware, or a combination of software and hardware. As can be appreciated by those of ordinary skill within the art, the system 600 can and typically does include other components or mechanism, in addition to and/or in lieu of the mechanisms 602 and 604 depicted in FIG. 6.

The GUI mechanism 602 displays graphical representations of new OOP patterns and of preconstructed OOP patterns, as has been described in relation to and shown in FIGS. 4 and 5. The GUI mechanism 602 further enables the graphical representations of the preconstructed OOP patterns to be dragged onto the graphical representations of the new OOP patterns, as has also been described in relation to and shown in FIGS. 4 and 5. More specifically, the GUI mechanism 602 displays graphical representations of the behaviors of the new OOP patterns, and the graphical representations of the preconstructed OOP patterns are enabled to be dragged onto the graphical representations of these behaviors.

The delegation mechanism 604 delegates behaviors of the new OOP patterns to the preconstructed OOP patterns in response to the graphical representations of the preconstructed OOP patterns having been dragged onto the graphical representations of the new OOP patterns, as has been described in relation to and shown in FIGS. 4 and 5. In particular, the delegation mechanism 604 delegates behaviors of the new OOP patterns to the preconstructed OOP patterns in response to the graphical representations of the preconstructed OOP patterns having been dragged onto the graphical representations of the behaviors of the new OOP patterns. In this way, the behaviors of the new OOP patterns are implemented by the preconstructed OOP patterns.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. A method comprising:
   defining, using a computer program executed by a computing device, a new object-oriented programming (OOP) pattern having a first behavior and a second behavior, the new OOP pattern having one or more objects to implement the second behavior, the new OOP pattern not having any object to implement the first behavior; and,
   delegating, using the computer program executed by the computing device, the first behavior of the new OOP pattern to one of a plurality of preconstructed OOP patterns to implement the first behavior by the one of the preconstructed OOP patterns,
   wherein each behavior of the new OOP pattern has an expand method to perform the behavior of the pattern and an update method that listens for execution of the expand method and performs additional processing as a result, wherein delegating the first behavior to one of the preconstructed OOP patterns comprises attaching the one of the preconstructed OOP patterns to the update method of the new OOP pattern,
   such that the new OOP pattern is constructed at least in part by delegating the first behavior of the new OOP pattern to the one of the preconstructed OOP patterns, the one of the preconstructed OOP patterns having one or more objects to implement the first behavior,
   wherein the preconstructed OOP patterns are not subsidiary in any way to the new OOP pattern, except that the one of the preconstructed OOP patterns is delegated the first behavior of the new OOP pattern, such that the new OOP pattern is of equal hierarchical priority with respect to the preconstructed OOP patterns,
   wherein delegation of the first behavior of the new OOP pattern to the one of the preconstructed OOP pattern is different than and occurs at a higher hierarchical level than delegating functionality of any object to any other object, wherein the new OOP pattern and the preconstructed OOP patterns are at a higher hierarchical level than any objects that make up the new OOP pattern and the preconstructed OOP patterns, and each OOP pattern is defined as a set of constraint on any objects that make up the OOP pattern.

2. The method of claim 1, wherein the new OOP pattern has one or more additional behaviors, such that each additional behavior is delegated to one of the plurality of preconstructed OOP patterns to implement the additional behavior by the one of the preconstructed OOP patterns.

3. The method of claim 1, further comprising receiving the plurality of preconstructed OOP patterns before delegating the first behavior of the new OOP pattern to one of the preconstructed OOP patterns.

4. The method of claim 1, wherein the new OOP pattern is capable of being employed to construct other new OOP patterns in that behaviors of the other new OOP patterns are capable of being delegated to the OOP pattern.

5. The method of claim 1, wherein the new OOP pattern is a first new OOP pattern, the method further comprising:
   defining a second new OOP pattern having a behavior; and,
   delegating the behavior of the second new OOP pattern to the first new OOP pattern to implement the behavior by the first new OOP pattern,
   such that the second new OOP pattern is constructed at least in part by delegating the behavior of the second new OOP pattern to the first new OOP pattern.

6. The method of claim 5, the method further comprising:
delegating another behavior of the second new OOP pattern to one of the preconstructed OOP patterns to implement the other behavior by the one of the preconstructed OOP patterns,
such that the second new OOP pattern is further constructed at least in part by delegating the other behavior of the second new OOP pattern to the preconstructed OOP patterns.

7. The method of claim 5, the method further comprising:
defining a third new OOP pattern having a behavior; and,
delegating the behavior of the third new OOP pattern to one of the first new OOP pattern and the second new OOP pattern to implement the behavior,
such that the third new OOP pattern is constructed at least in part by delegating the behavior of the third new OOP pattern to at least one of the first new OOP pattern and the second new OOP pattern.

8. The method of claim 1, wherein delegating the first behavior of the new OOP pattern to one of the preconstructed OOP patterns comprises:
within a graphical user interface (GUI), displaying a graphical representation of the new OOP pattern;
within the GUI, displaying a graphical representation of each of the preconstructed OOP patterns; and,
within the GUI, associating the graphical representation of a selected preconstructed OOP pattern with the graphical representation of the new OOP pattern to cause the first behavior of the new OOP pattern to be delegated to the selected preconstructed OOP pattern.

9. A system comprising:
hardware, including a processor and a memory storing computer-executable code that when executed by the processor causes implementation of:
a graphical user interface (GUI) mechanism to display graphical representations of a new object-oriented programming (OOP) pattern and of one or more preconstructed OOP patterns and to enable the graphical representations of the preconstructed OOP patterns to be associated with the graphical representation of the new OOP pattern;
wherein the new OOP pattern has second behaviors and one or more objects to implement the second behaviors, the new OOP pattern not having any objects to implement the second behaviors,
wherein the preconstructed OOP patterns have one or more objects to implement the first behaviors, and,
a delegation mechanism to delegate first behaviors of the new OOP pattern to the preconstructed OOP patterns in response to the graphical representations of the preconstructed OOP patterns being associated with the graphical representation of the new OOP pattern, in order to implement the first behaviors of the new OOP pattern by the preconstructed OOP patterns,
wherein each behavior of the new OOP pattern has an expand method to perform the behavior of the pattern and an update method that listens for execution of the expand method and performs additional processing as a result, wherein delegating the first behavior to one of the preconstructed OOP patterns comprises attaching the one of the preconstructed OOP patterns to the update method of the new OOP pattern,
wherein the preconstructed OOP patterns are not subsidiary in any way to the new OOP pattern, except that selected of the preconstructed OOP patterns are delegated the first behaviors of the new OOP pattern, such that the new OOP pattern is of equal hierarchical priority with respect to the preconstructed OOP patterns,
wherein delegation of the first behaviors of the new OOP pattern to the preconstructed OOP patterns is different than and occurs at a higher hierarchical level than delegating functionality of any object to any other object, wherein the new OOP pattern and the preconstructed OOP patterns are at a higher hierarchical level than any objects that make up the new OOP pattern and the preconstructed OOP patterns, and each OOP pattern is defined as a set of constraints on any objects that make up the OOP pattern.

10. The system of claim 9, wherein the graphical representation of the new OOP pattern comprises a graphical representation of each first behavior of the new OOP pattern, such that associating the graphical representation of one of the preconstructed OOP patterns with the graphical representation of one of the first behaviors of the new OOP pattern causes the one of the first behaviors of the new OOP pattern to be delegated to the one of the preconstructed OOP patterns.

11. The system of claim 9, wherein the new OOP pattern is a member of the preconstructed OOP patterns after construction of the new OOP pattern, such that the new OOP pattern is capable of being employed to construct other new OOP patterns in that behaviors of the other new OOP patterns are capable of being delegated to the OOP pattern.

12. An article of manufacture comprising:
a memory storage device storing computer-executable code that when executed by a processor causes the processor to:
delegate a first behavior of an object-oriented programming (OOP) pattern to one of a plurality of preconstructed OOP patterns to implement the behavior by the one of the preconstructed OOP patterns,
wherein the OOP pattern has a second behavior and one or more objects to implement the second behavior, the OOP pattern not having any object to implement the first behavior,
wherein the one of the preconstructed OOP patterns has one or more objects to implement the first behavior,
wherein each behavior of the OOP pattern has an expand method to perform the behavior of the pattern and an update method that listens for execution of the expand method and performs additional processing as a result, wherein delegating the first behavior to one of the preconstructed OOP patterns comprises attaching the one of the preconstructed OOP patterns to the update method of the OOP pattern,
wherein the preconstructed OOP patterns are not subsidiary in any way to the new OOP pattern, except that at least one of the preconstructed OOP patterns are delegated the first behavior of the OOP pattern, such that the OOP pattern is of equal hierarchical priority with respect to the preconstructed OOP patterns,
wherein delegation of the first behavior of the new OOP pattern to the one of the preconstructed OOP pattern is different than and occurs at a higher hierarchical level than delegating functionality of any object to any other object, wherein the new OOP pattern and the preconstructed OOP patterns are at a higher hierarchical level than any objects that make up the new OOP pattern and the preconstructed OOP patterns, and each OOP pattern is defined as a set of constraint on any objects that make up the OOP pattern.

13. The article of claim 12, wherein the means is further for adding the OOP pattern to the plurality of preconstructed OOP patterns, such that the OOP pattern is capable of being employed to construct other OOP patterns in that behaviors of the other OOP patterns are capable of being delegated to the OOP pattern.

14. The article of claim 12, wherein the OOP pattern is a first OOP pattern, and the means is further for delegating each of at least one behavior of a second OOP pattern to one of the first OOP pattern and the preconstructed OOP patterns to implement the behavior by the one of the first OOP pattern and the preconstructed OOP patterns.

15. The method of claim 1, wherein the new OOP pattern further has a third behavior delegated to the one of the preconstructed OOP patterns to which the first behavior has been delegated, wherein the third behavior is delegated to a different instance of the one of the preconstructed OOP patterns than that to which the first behavior is delegated.

\* \* \* \* \*